United States Patent Office 3,684,581
Patented Aug. 15, 1972

3,684,581
DRY-CHARGED STORAGE BATTERY HAVING AN ELECTROLYTE RESERVOIR AND THE BATTERY CASE COMBINED IN A UNIT
Frédéric Jufer, Motiers, Switzerland, assignor to SIC, Societe Industrielle du Caoutchouc S.A., Fleurier, Switzerland
Filed Feb. 5, 1970, Ser. No. 8,975
Claims priority, application Germany, Feb. 29, 1969, G 69 07 134.7
Int. Cl. H01m *45/00*
U.S. Cl. 136—162                  9 Claims

ABSTRACT OF THE DISCLOSURE

An electrolyte reservoir and the battery proper are combined in a unit.

---

An electrolyte reservoir and battery combined in a single structural unit wherein the reservoir is provided with a filling opening and wherein the battery is provided with a cover having transfer openings therein in communicating relationship with the reservoir and with the interior of respective cells of the battery.

The known dry-charged storage batteries comprising an electrolyte reservoir consist of three parts, namely, a standard storage battery, which is not yet filled with the electrolyte, a separate reservoir, which contains electrolyte, and a flexible filling tube for transferring the electrolyte from the reservoir into the dry-charged storage battery.

In view of this state of the art it is an object of the invention to simplify the transfer of the electrolyte from the storage container into the dry-filled battery.

It is another object to simplify the packaging and transport of batteries of the type mentioned first hereinbefore.

In a dry-charged storage battery of the kind described hereinbefore, the desired object is accomplished according to the invention in that the reservoir and the battery are combined in a unit. In a particularly desirable embodiment of the invention, the terminals and the connectors are disposed below the battery cover and straddle the separators and end walls and the terminals extend out of the box below the battery cover, either at an end wall or a side wall of the battery. The three-dimensional shape provided by the invention is surprising because the desired object may be accomplished and yet the German DIN standard specifications may be complied with so that the battery according to the invention does not have a larger overall height than the known dry-charged batteries.

In a desirable embodiment of the innovation, the reservoir is inserted into grooves formed in the battery cover and has a filling opening, which can be closed, and closed transfer openings leading to the interior of respective cells and adapted to be pierced. The closed transfer openings may be pierced in such a manner that the reservoir serves as a spray cage when the battery has been put to use. Besides, the reservoir may also serve as a make-up reservoir when the battery has been put to use and for this purpose the reservoir may be filled with an electrolyte to two-thirds of its capacity. In this case, the battery requires virtually no attendance and its life is increased.

Another advantage of the battery resides in that it can be tested, particularly for tightness, when the battery proper consisting of the box and cover and the remaining normal battery parts has been completed. The battery may be tested once more when the reservoir and the battery have been combined in a unit. The double testing ensures a higher reliability in operation.

Figure 1:
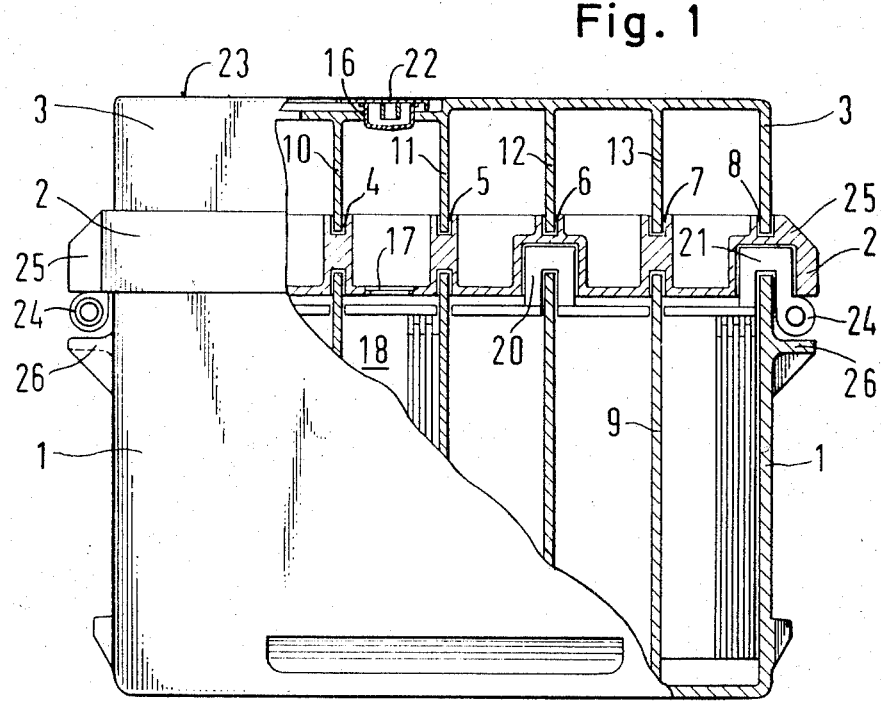
Figure 2:
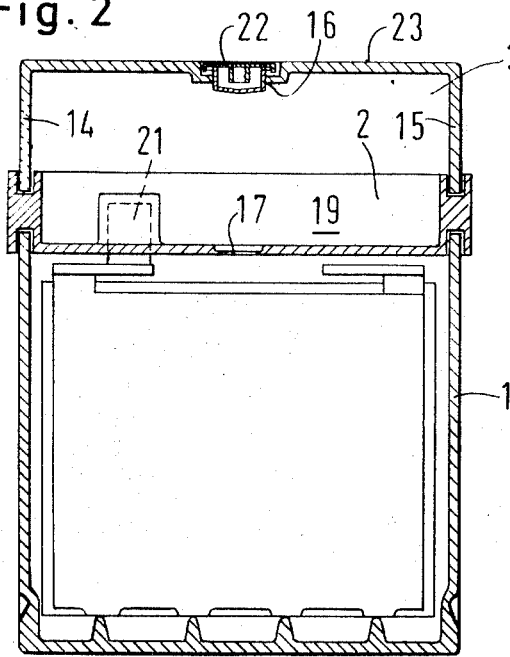
Figure 3:
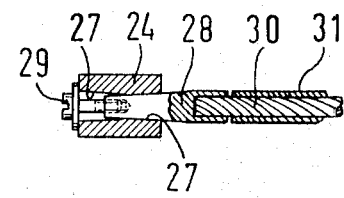
Figure 4:
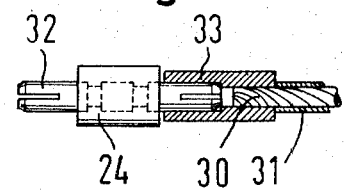

An embodiment of the invention will now be described by way of example with reference to the drawing in which FIG. 1 is a side elevation, partly in section, showing the battery according to the invention, FIG. 2 is a transverse sectional view showing a battery according to the invention and taken along the longitudinal center line of a cell and FIGS. 3 and 4 show two ways in which the connecting lines may be connected.

The dry-charged storage battery according to the invention consists of the battery box 1, the battery cover 2 and an electrolyte reservoir 3, which are combined in a unit. In the embodiment shown by way of example, the reservoir 3 has partitions 10–13, which correspond to the separators, such as 9, between the cells, and the outside walls 14, 15. These walls 10–15 are inserted into grooves 4–8 of the battery cover. This is accomplished in a simple manner in that the grooves 4–8 are filled with epoxide resin and the reservoir is then inserted into these grooves. A sealed joint is formed as the epoxide resin is cured.

The reservoir 3 has a filling opening 16, which can be closed, and a closed transfer opening 17 is located in cover 2 leading to the interior 18 of the cells. The battery cover 2 is tub-shaped over each cell in order to increase the interior space of the reservoir. As is best apparent from FIG. 2, the tub 19 extends throughout the width and length of the cell so that the only parts which are left of the battery cover 2 are the inner wall, which closes the interior space of the battery box, and partitions, which are formed with grooves for connecting the battery cover 2 to the battery box 1 in the manner which has been described hereinbefore for the connection of the reservoir 3 to the battery cover 2. The grooves or indentations of the battery cover 2 are enlarged to conform to the connectors 20 and the terminals 21 where these parts are provided.

As is apparent from FIGS. 1 and 2, the closure 22 for the filling opening 16 is flush with the plane surface 23 of the reservoir 3. For this reason, the battery may also be used as a stacked battery and has also an attractive appearance.

To put the dry-charged battery to use, it is sufficient to open the closure 22 of the filling opening 16 of the reservoir 3. Any desired tool, such as a screwdriver, or a suitably shaped special tool, may then be used to pierce the previously closed transfer opening 17, so that the electrolyte flows from the reservoir 3 into the interior 18 of each cell. If the closed transfer openings 17 are pierced only at their center or are pierced with a special tool to form a plurality of dot-shaped holes, the battery cover 2 together with the reservoir 3 will serve as a spray cage. The closure plug 22 of the reservoir 3 must then be pierced to provide a vent opening or must be replaced by another closure plug which has a corresponding bore so that the gases evolved in operation can escape.

The reservoir 3 may be used as a make-up reservoir, if desired, and for this purpose may be filled with additional electrolyte to two-thirds of its capacity. From the reservoir used now as a make-up reservoir, electrolyte can now drain into the interior of the cell to mak up for consumed electrolyte so that the battery requires virtually no attendance and its life is much increased.

To save lead for the connectors and for the terminals, it is also a feature of the invention to provide terminals 21 which extend out of the box 2 below the battery cover 2. As is shown in the embodiment of FIG. 1, the terminals 21 may extend out at the end wall of the box 1. If the space available at the ends of the battery in a given vehicle is not sufficient to accommodate terminals extending out at the end, it will obviously be possible to extend the terminals out at the two side walls of the battery.

The terminal which thus extends out of the box below the battery cover and the means for making a connection to this terminal may be designed as desired. It has been found dsirable, however, to provide exposed eyes 24 at the ends of those parts of the terminals 21 which extend out below the cover. It is also desirable to form the terminal eye for the negative terminal and the terminal eye for the positive terminal with different bore diameters so that the connecting parts of the leads connected to the terminals may be designed so as to prevent a confusion between the negative and positive terminals because it is not possible to make a connection to the wrong terminal.

As is also readily apparent from FIG. 1, the exposed parts of the terminals 21 are protected by an overhanging part 25 of the battery cover 2 and an overhanging part 26 of the battery box 1. In the embodiment shown by way of example, these overhanging parts 26 of the box 1 are designed as a handle.

It is apparent from FIGS. 3 and 4 that the connection may be in numerous forms if those parts of the terminals 21 which extend out below the cover terminate in exposed eyes 24. In the embodiment shown in FIG. 3, the bore 27 is double-conical and has a throat in the middle of the eye 24. A mating conical contact pin 28 may then be inserted into the conical bore 27 and be fixed in position by a clamp screw 29. The lead wire is designated 30 and the insulation is designated 31.

In the embodiment shown in FIG. 4, a so-called banana plug 32 is disposed in the bore of the eye 24 and a connecting sleeve 33 can be pushed onto the plug on both sides of the eye 24. The sleeve may be provided with a lock nut, if desired.

What I claim is:

1. A dry-charged storage battery with at least one cell, said battery comprising: a reservoir for holding electrolyte and having a single opening therein that may be selectively opened or closed; a battery joined with said reservoir to form one structural unit, said battery having a grooved cover with a closed, pierceable, transitional opening adjacent the interior of the battery cell; said reservoir having outer walls positioned in selected ones of the grooves of said cover; and plastic material within said grooves tightly connecting the reservoir to said cover.

2. A battery according to claim 1, characterized in that the reservoir (3) is inserted into the grooves (4–7) of the battery cover (2) and has an opening (16) which can be closed and closed transfer openings (17) leading to the interior (18) of respective cells and adapted to be pierced.

3. A battery according to claim 2, characterized in that the battery cover (2) is tub-shaped (19) over each cell (18) in order to increase the interior of the reservoir (3) and the reservoir (3) is provided with partitions (10–13), which correspond to the separators (9) between the cells.

4. A battery according to claim 2, having a closure (22) positioned adjacent said opening (16) in said reservoir (3) and characterized in that the closure (22) for the filling opening (16) of the reservoir (3) is flush with the plane surface (23) of the reservoir.

5. A battery according to claim 1, further having separators (9) and end walls in said battery and having terminals (21) and connectors (20) disposed below the battery cover (2) and straddling the separators (9) and the end walls, the terminals (21) extending out below the battery cover (2) at an end wall of the box (1).

6. A battery according to claim 5, characterized in that those parts of the terminals (21) which extend out below the cover (2) terminate in exposed eyes (24).

7. A battery according to claim 6, characterized in that the terminals (24) for the negative pole and the terminals for the positive pole have different bore diameters.

8. A battery according to claim 5 further comprising a box (1) and wherein the cover (2) includes overhanging parts (25) and the box (1) includes overhanging parts (26), the exposed eyes (24) of the terminals (21) being protected by said overhanging parts and the overhanging parts (26) of the box (1) forming a handle.

9. A battery having at least one cell, said battery comprising: a walled battery box and a cover positioned on the box, said cover having grooves and indentations therein; terminals extending laterally from the box; cell connections arranged beneath the cover; the bottom surface of said cover having said indentations therein extending over the walls of the box; the cover and the box being connected together by plastic material; a reservoir for holding an electrolyte having an opening therein that may be selectively opened or closed for enabling the electrolyte to pass into the reservoir; said cover having a closed, pierceable, transition opening for introducing the electrolyte toward the interior of the cell; said terminals extending out of the battery box and positioned in selected ones of said indentations located on the lower surface of said cover; and said reservoir being mounted in the glued to selected ones of said grooves of the cover by plastic material.

References Cited

UNITED STATES PATENTS

| | | | |
|---|---|---|---|
| 1,396,172 | 11/1921 | Fear | 136—162 |
| 2,505,307 | 4/1950 | Riggs | 136—170 |
| 2,832,814 | 4/1958 | Shannon | 136—162 |
| 2,624,767 | 1/1953 | Moulton | 136—113 |
| 3,483,041 | 12/1969 | Kalen | 136—181 |
| 2,783,291 | 2/1957 | Gold | 136—90 |
| 3,455,738 | 7/1969 | Ruben | 136—6 |
| 3,329,531 | 7/1967 | Hennen | 136—170 X |
| 2,141,079 | 12/1938 | Bolich | 136—162 |
| 3,485,678 | 12/1969 | Blaich et al. | 136—162 |
| 3,532,557 | 10/1970 | Sasagawa | 136—170 |
| 2,746,002 | 5/1956 | Robillard | 136—181 X |
| 3,510,360 | 5/1970 | Steiner | 136—162 |

FOREIGN PATENTS

| | | | |
|---|---|---|---|
| 563,323 | 8/1944 | Great Britain | 136—162 |
| 1,052,428 | 12/1966 | Great Britain | 136—162 |
| 79,712 | 8/1955 | Denmark | 136—170 |
| 168,188 | 8/1959 | Sweden | 136—170 |

ANTHONY SKAPARS, Primary Examiner

U.S. Cl. X.R.

136—166, 170